United States Patent
Okamoto

(10) Patent No.: US 7,256,531 B2
(45) Date of Patent: Aug. 14, 2007

(54) DRIVING APPARATUS

(75) Inventor: Yasuhiro Okamoto, Tondabayashi (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 141 days.

(21) Appl. No.: 11/117,953

(22) Filed: Apr. 29, 2005

(65) Prior Publication Data

US 2005/0253483 A1 Nov. 17, 2005

(30) Foreign Application Priority Data

May 14, 2004 (JP) .............................. 2004-144586

(51) Int. Cl.
*H01L 41/08* (2006.01)

(52) U.S. Cl. .......................... 310/323.12; 310/323.16; 310/325

(58) Field of Classification Search ................ 310/328, 310/323.02, 323.03, 323.12, 323.16, 325
See application file for complete search history.

(56) References Cited

U.S. PATENT DOCUMENTS

| | | | | |
|---|---|---|---|---|
| 3,140,859 A * | 7/1964 | Scarpa | ......................... | 366/114 |
| 4,220,886 A * | 9/1980 | Ciszewski et al. | .......... | 310/325 |
| 6,188,161 B1 * | 2/2001 | Yoshida et al. | ............. | 310/328 |
| 6,781,283 B2 * | 8/2004 | Tsukimoto | ............. | 310/323.16 |

FOREIGN PATENT DOCUMENTS

JP       08-286093 A      11/1996

\* cited by examiner

*Primary Examiner*—Mark Budd
(74) *Attorney, Agent, or Firm*—Sidley Austin LLP

(57) ABSTRACT

A driving apparatus of the invention comprises a fixed member, a piezoelectric element fixed at one end to the fixed member, and a driving friction member fixed to the other end of the piezoelectric element. The driving apparatus of the invention is arranged to move a movable unit which is slidably mounted on the driving friction member by expansion and contraction of the piezoelectric element. Herein, a bonded surface of the piezoelectric element to the driving friction member is included in a bonded surface of the driving friction member to the piezoelectric element.

20 Claims, 3 Drawing Sheets

DRIVING APPARATUS

CROSS-REFERENCE TO RELATED APPLICATIONS

This application is based upon and claims the benefit of priority from the prior Japanese Patent Application No. 2004-144586 filed on May 14, 2004, the entire contents of which are incorporated herein by reference.

BACKGROUND OF THE INVENTION

1. Field of the Invention

The present invention relates to a driving apparatus using an electromechanical transducer such as a piezoelectric element, an electrostrictive element, or a magnetostrictive element. More particularly, the present invention relates to a driving apparatus in which a driving friction member is bonded to an electromechanical transducer by adhesive.

2. Description of Related Art

Heretofore, there has been used a driving apparatus for moving a movable unit by utilizing an electromechanical transducer such as a piezoelectric element, an electrostrictive element, or a magnetostrictive element. In such driving apparatus, for example, the electromechanical transducer is fixed at one end to a fixed member and at the other end to a driving friction member, respectively, and a movable unit is slidably mounted on the driving friction member with friction. When the electromechanical transducer is slowly deformed, the movable unit is moved along with the driving friction member by friction. When the electromechanical transducer is quickly deformed, on the other hand, the movable unit remains at the same place by inertia. This driving apparatus is used to produce a requested movement of the movable unit by appropriately combining those slow and quick movements.

Herein, the electromechanical transducer and the driving friction member are commonly coupled by adhesive. These have conventionally been designed to have bonded areas as large as possible in order to prevent the adhesive from easily peeling due to deterioration from vibrations for driving, long-term use, or other causes. For example, Japanese unexamined patent publication No. H8(1996)-286093 (FIG. 3) discloses a driving apparatus in which a piezoelectric element and a driving friction member are integrally adhered and fixed so that a coupling part of them is entirely covered with a reinforcing member.

In the driving apparatus disclosed in the '093 publication, however, the reinforcing member is overlaid on the driving friction member, so that the actually available length of the driving friction member would be reduced by just that much. If the reinforcing member is simply eliminated, on the contrary, the apparatus is provided as a driving apparatus 100 shown in FIG. 5. In this driving apparatus 100, a driving friction member 102 and a fixed member 103 are bonded to both ends of a piezoelectric element 101 respectively by adhesive 120. The driving friction member 102 is held to be movable in its axial direction by bearings 104 and 105.

In such conventional driving apparatus 100, the adhesive 120 applied between the piezoelectric element 101 and the driving friction member 102 creeps, due to its fluidity, leftward in the figure along the periphery of the driving friction member 102. The creeping amount varies with an application amount and an application position of the adhesive 102. Accordingly, it would be necessary to determine the placement of the bearing 105 in consideration of the creeping amount. Specifically, the distance S from a bonded surface 121 to a right end of the bearing 105 is determined by adding a maximum creeping amount of the adhesive 102 to a maximum expanding amount of the piezoelectric element 101. In this figure, the adhesive 102 that crept is shown very exaggeratedly. However, even the adhesive that crept very thinly would also interfere with the bearing 105.

Consequently, an effective length Q of the driving friction member 102 is a length obtained by subtracting the distance S and each width of the bearings 104 and 105 from a whole length P of the driving friction member 102. This effective length Q is a range where a movable unit can frictionally be mounted on the driving friction member 102, that is, a movable range of the movable unit. In recent years, there is an increasingly demand to further reduce the entire size of the driving apparatus 100, particularly, the axial length. However, the reduction in the effective length Q is undesirable in view of driving performances.

SUMMARY OF THE INVENTION

The present invention has been made to overcome the above problems of the conventional driving apparatus and to provide a driving apparatus using an electromechanical transducer, the apparatus having a reduced axial length without reducing a movable range of a movable unit.

To achieve the purpose of the invention, there is provided a driving apparatus comprising a fixed member, an electromechanical transducer one end of which is fixed to the fixed member, and a driving friction member bonded to the other end of the electromechanical transducer, to move a movable unit which is slidably held by the driving friction member by expansion and contraction of the electromechanical transducer, wherein a bonded surface of the electromechanical transducer with respect to the driving friction member is included in a bonded surface of the driving friction member with respect to the electromechanical element.

According to another aspect of the invention, there is provided a driving apparatus comprising: a driving friction member which slidably holds a movable unit; a fixed member; and an electromechanical transducer having one end fixed to the fixed member and the other end bonded to the driving friction member, the electromechanical transducer expanding and contracting to vibrate the driving friction member, thereby moving the movable unit with respect to the driving friction member, wherein a bonded surface of the electromechanical transducer with respect to the driving friction member is included in a bonded surface of the driving friction member with respect to the electromechanical element.

The driving apparatus of the invention, in which the electromechanical transducer is bonded at one end to the fixed member and at the other end to the driving friction member, is used to move the movable unit mounted on the driving friction member by expansion and contraction of the electromechanical transducer. In the invention, the bonded surface of the electromechanical transducer to the driving friction member is included in, that is, smaller in area than the bonded surface of the driving friction member to the electromechanical transducer. Even where these bonded surfaces are bonded by adhesive, the adhesive will creep to adhere along the electromechanical transducer. More specifically, the adhesive does not adhere to the periphery of the driving friction member, so that there is no need to consider the creeping amount of the adhesive regarded in the conventional apparatus. Consequently, the driving apparatus having a shortened length in its axial direction can be realized without needing a reduction in movable range of the movable unit.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of the present invention will now be given referring to the accompanying drawings. In the present embodiment, the invention is applied to a driving apparatus utilizing a piezoelectric element.

Figure 1:
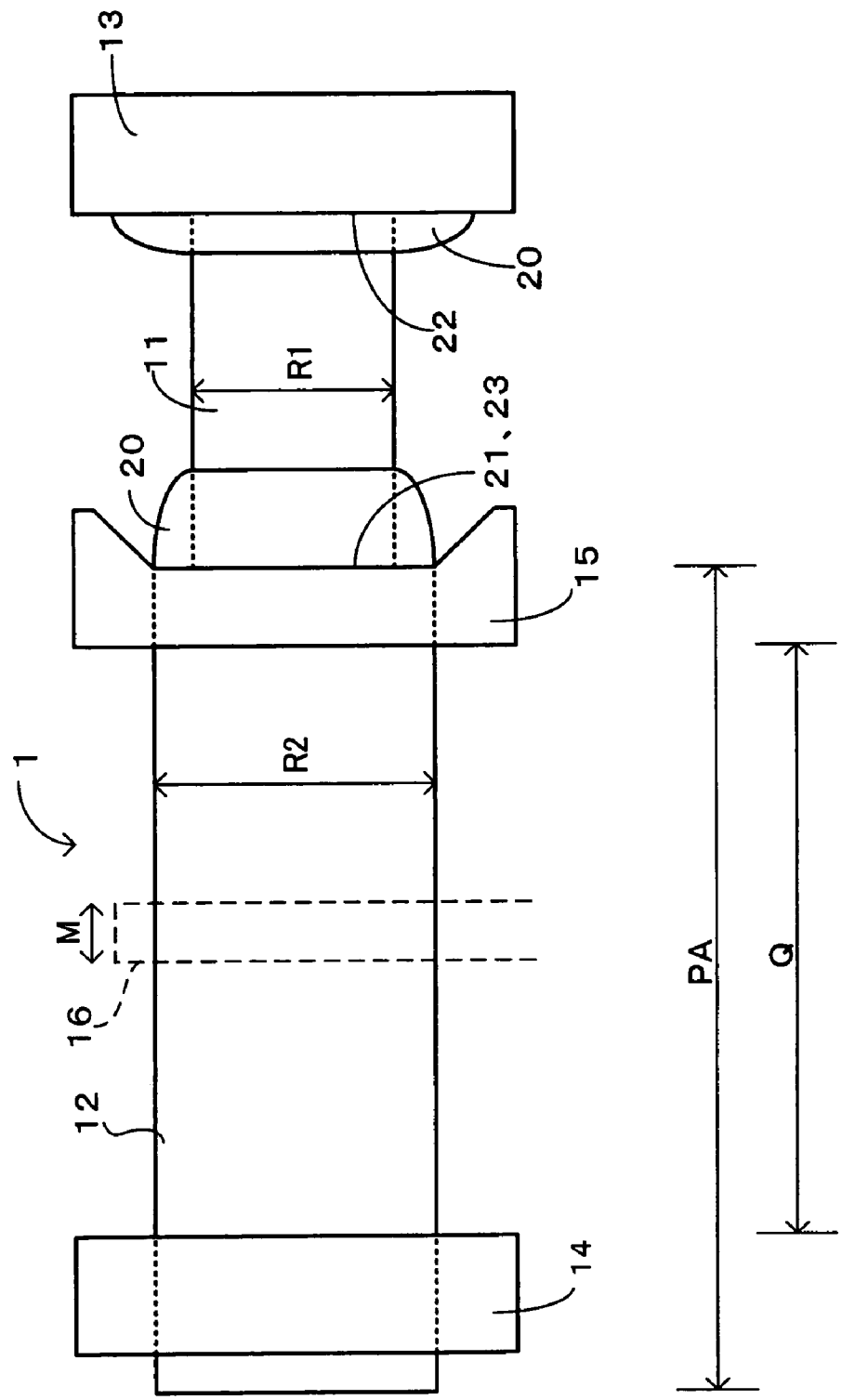
FIG. 1 is a schematic external view of a driving apparatus in a present embodiment.

As shown in FIG. 1, a driving apparatus 1 in the present embodiment is constructed such that a piezoelectric element 11 is adhered and fixed at one end to a driving friction member 12 and at the other end to a fixed member 13. Arranged at both ends of the driving friction member 12 are bearings 14 and 15 which hold the driving friction member 12 movably in its axial direction. A movable unit 16 is slidably engaged on the driving friction member 12 between the bearings 14 and 15 with friction. This driving apparatus 1 is used to move the movable unit 16 in the axial direction indicated by an arrow M.

Figure 2:
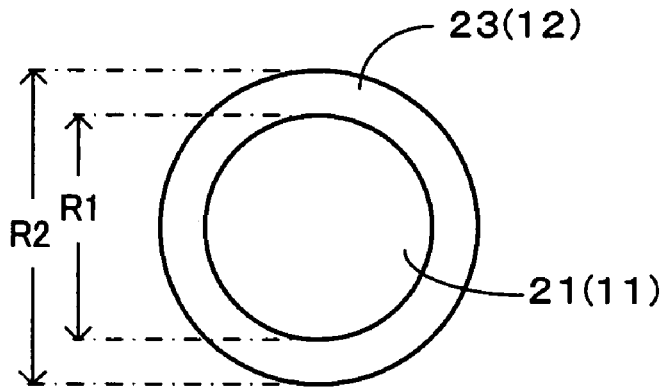
FIG. 2 is an explanatory view (first example) showing a comparison of thickness between a driving friction member and a piezoelectric element.

In this driving apparatus 1, the driving friction member 12 is of a cylindrical shape having a diameter R2 determined to be slightly larger than a diameter R1 of the piezoelectric element 11 as shown in FIG. 1. In other words, respective locations of bonded surfaces 21 and 23 of the piezoelectric element 11 and the driving friction member 12 are for example illustrated in an overlapping view in FIG. 2. The bonded surface 23 of the driving friction member 12 to the piezoelectric element 11 and the bonded surface 21 of the piezoelectric element 11 to the driving friction member 12 are both circular. For the circular bonded surface 21 of the piezoelectric element 11 as shown in FIG. 2, the bonded surface 23 of the driving friction member 12 is made concentrically larger in diameter than the bonded surface 21. The bonded surface 21 of the piezoelectric element 11 is entirely included in the bonded surface 23 of the driving friction member 12 and no part protrudes from the bonded surface 23. On the other hand, the bonded surface 23 of the driving friction member 12 partially protrudes from the bonded surface 21 of the piezoelectric element 11.

Figure 3:
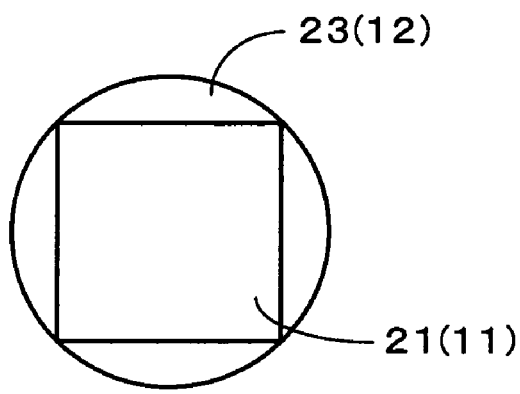
FIG. 3 is an explanatory view (second example) showing a comparison of thickness between a driving friction member and a piezoelectric element.
Figure 4:
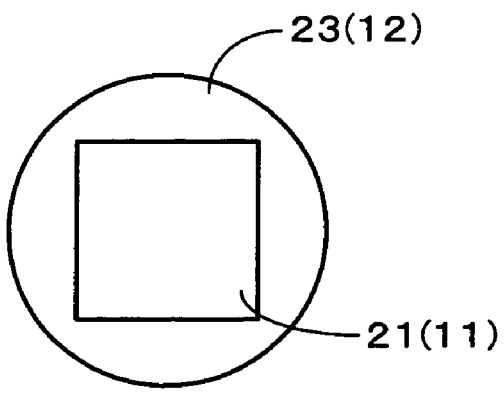
FIG. 4 is an explanatory view (third example) showing a comparison of thickness between a driving friction member and a piezoelectric element.

In an alternative, the bonded surface 21 of the piezoelectric element 11 may be square as shown in FIG. 3. In this case, the section of the driving friction member 12 is formed as a circle circumscribing the square. Alternatively, as shown in FIG. 4, the bonded surface 23 of the driving friction member 12 may be formed as a circle larger in diameter than that in FIG. 3. In either case, the bonded surface 21 of the piezoelectric element 11 is entirely included in the bonded surface 23 of the driving friction member 12 and no part protrudes from the bonded surface 23. On the other hand, the bonded surface 23 of the driving friction member 12 partially protrudes from the bonded surface 21 of the piezoelectric element 11.

Herein, the piezoelectric element 11 and the driving friction member 12 are bonded by adhesive 20 applied on respective bonded surfaces 21 and 23. The adhesive 20 will creep from the bonded surface 23 after adhesion. At this time, the adhesive 20 having fluidity will creep from the protruding bonded surface onto the periphery of a member having a smaller diameter. Specifically, in this driving apparatus 1, the adhesive 20 applied to the bonded surfaces 21 and 23 of the piezoelectric element 11 and the driving friction member 12 will creep from the bonded surface 23 of the driving friction member 12 to and along the periphery of the piezoelectric element 11. At the opposite end of the piezoelectric element 11, similarly, the adhesive 20 applied to a bonded surface 22 of the fixed member 13 with respect to the piezoelectric element 11 will creep along the periphery of the piezoelectric element 11. It is to be noted that FIG. 1 very exaggeratedly illustrates the adhesive 20 that crept.

Accordingly, the adhesive 20 will not creep from the bonded part toward the driving friction member 12. This is because the piezoelectric element 11 has no part protruding in section from the driving friction member 12 near the bonded surfaces 21 and 23. Thus, in this driving apparatus 1, as shown in FIG. 1, the bearing 15 is disposed so that a right end of a bearing part in the figure is flush with the bonded surface 23. More specifically, the bearings 14 and 15 support the driving friction member 12 at its both ends. Even when the piezoelectric element 11 expands, moving the bonded surface 23 leftward from the position shown in FIG. 1, it will not interfere with the bearing 15 because there is no thicker part than the driving friction member 12 near the bonded surfaces 21 and 23 even if the hardened adhesive 20 is taken into consideration. Since the expanding distance of the piezoelectric element 11 is not so large, the bonded surface 23 is unlikely to move leftward in the figure beyond the width of the bearing 15.

Figure 5:
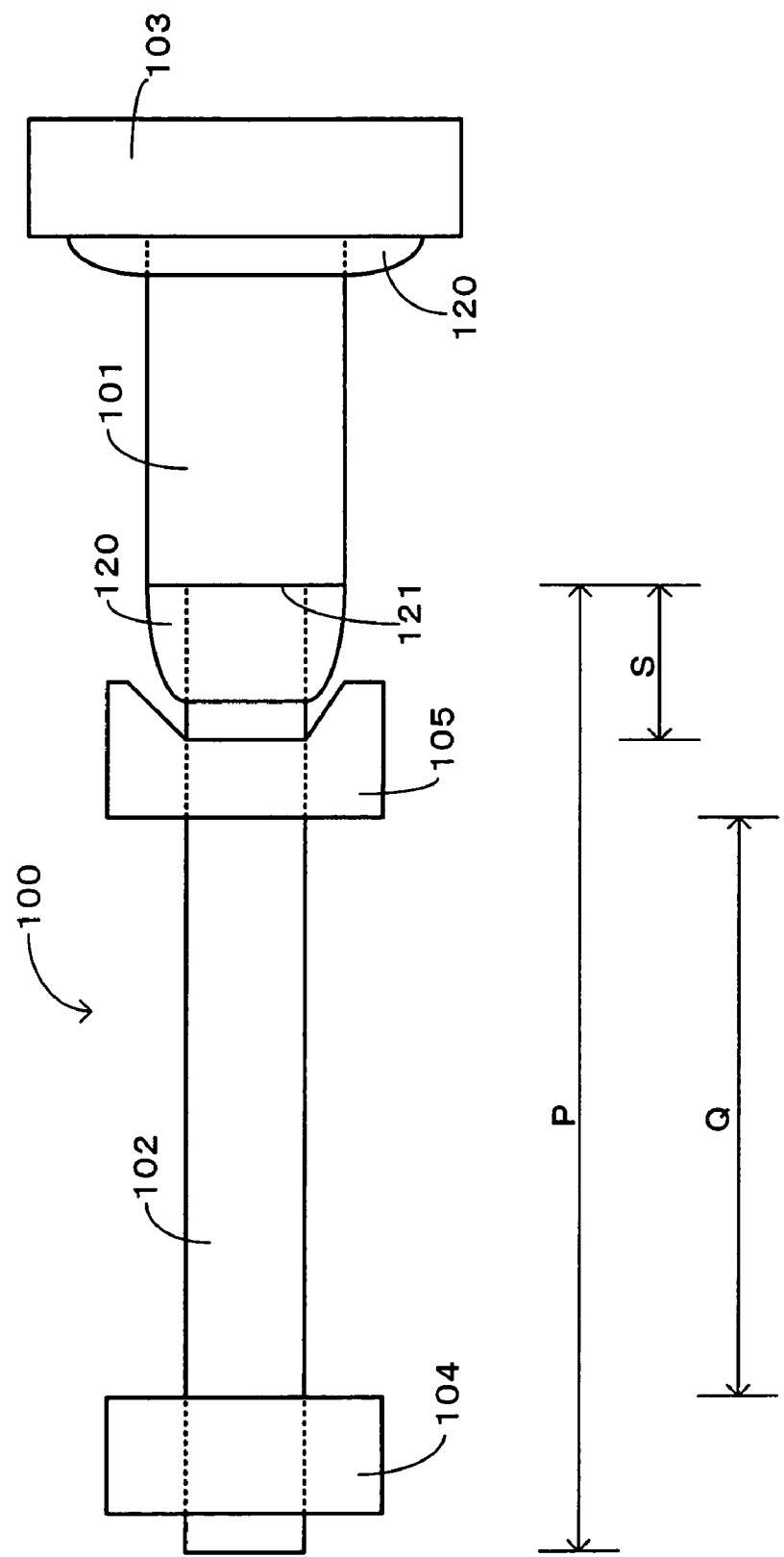
FIG. 5 is a schematic external view of a conventional driving apparatus.

The above arrangement does not need the distance S in the conventional driving apparatus 100 shown in FIG. 5. Accordingly, in the case where the effective length Q of the driving apparatus 1 in which the movable unit 16 can be mounted is equal to the effective length Q of the conventional driving apparatus 100 shown in FIG. 5, a component length PA of the driving friction member 12 of the driving apparatus 1 can be shorter by the distance S than the component length P of the driving friction member 102 of the conventional driving apparatus 100. This makes it possible to achieve the driving apparatus 1 having the axial length shorter by the distance S than axial length of the conventional driving apparatus 100 in regard to the equal effective lengths Q.

A driving method of the above driving apparatus is the same as a conventional one. The movable unit 16 is mounted on the driving friction member 12 and held in a stopped state by friction. When a voltage of slowly rising and falling waveforms is applied to the piezoelectric element 11, which is deformed (expanded or contracted) to slowly displace the driving friction member 12, the movable unit 16 is moved along with the driving friction member 12 by friction. When the piezoelectric element 11 is quickly deformed (expanded or contracted), inertia surpasses the friction and thus the movable unit 16 remains at the same place. In the driving apparatus 1, the above movements can appropriately be combined to vibrate the driving friction member 12 and to produce a requested movement of the movable unit 16.

The inventor of the present invention has tested a bonding strength of the bonded surfaces 21 and 23 in the driving apparatus 1 constructed as above and a conventional driving apparatus 100. In the conventional driving apparatus 100 of this test, the driving friction member 102 having a diameter of 1 mm and the piezoelectric element 11 having a diameter of 1.2 mm were used. On the other hand, in the driving apparatus of the present invention, the driving friction member 12 having a diameter of 1.3 mm to 1.5 mm was bonded to the piezoelectric element 11 having a diameter of 1.2 mm by adhesive. The above test revealed that even the driving apparatus 1 including such thick driving friction member 12 bonded to the piezoelectric element 11 had a bonding strength substantially equal to that in the conventional driving apparatus 100. It is further found that the piezoelectric element 11 having a square section as shown in FIG. 3 provided a higher bonding strength. This may be considered as the moment of a bonding force is large in the case shown in FIG. 3. More specifically, the maximum diameter of the bonded portion, which corresponds to the length of a diagonal line of the bonded surface 21 of the piezoelectric element 11, is equal to the diameter R2 of the bonded surface 23 of the driving friction member 12.

According to the driving apparatus 1 in the present embodiment, as described above in detail, the piezoelectric element 11 and the driving friction member 12 are bonded by the adhesive 20, and the shape of an end face of the driving friction member 12 at the bonded surface 23 is larger in area the shape of an end face of the piezoelectric element 11 so that the end face of piezoelectric element 11 is completely included in the end face of the driving friction member 12. Accordingly, the adhesive 20 is allowed to creep only toward the piezoelectric element 11. The bearing 15 can therefore be disposed so that the bearing 15 is flush with the end face of the driving friction member 12. Hence, the distance S is unnecessary and the component length PA can be reduced than before in regard to the equal effective lengths Q. Consequently, the driving apparatus 1 having a reduced axial length can be realized with no reduction in movable range of the movable unit 16.

The above embodiment is just an example not limiting the present invention. The present invention may be embodied in other specific forms without departing from the spirit or essential characteristics thereof.

For instance, the sectional shape of driving friction member 12 is not limited to a circle. Any shape may be adopted if only the entire end face of the piezoelectric element 11 is in contact with the end face of the driving friction member 12. For example, the sectional shape may be formed by cutting out a part of the periphery of the driving friction member 12 in the form of a bowstring. Further, the sectional shape of the piezoelectric element 11 may be any shape besides the above mentioned circular and square shapes.

Moreover, the driving friction member 12 may be shaped nonuniformly in its axial direction. For example, the driving friction member 12 may have a shape thicker at only a part near the bonded surface 21 and thinner at other parts.

Each shape of the fixed member 13 and bearings 14 and 15 in the above mentioned driving apparatus 1 is just an example and not limited to above.

The above embodiment exemplifies the driving apparatus 1 using the piezoelectric element 11; however, the present invention is similarly applicable to other electromechanical transducers such as an electrostrictive element and magnetostrictive element.

Furthermore, in the present invention, the driving friction member may have a sectional shape which is circularly arcuate in at least a part of the periphery. At least the part including the bonded surface of the electromechanical transducer to the driving friction member may have a polygonal sectional shape circumscribed by the circular sectional shape of the driving friction member.

Accordingly, at least a part of the periphery of the driving friction member is circularly arcuate and the part including at least the bonded surface of the electromechanical transducer to the driving friction member has a polygonal shape circumscribed by the circular shape of the driving friction member circumscribes. This makes it possible to provide the maximum moment of a bonding force in a range that the bonded surface of the electromechanical transducer does not protrude from the bonded surface of the driving friction member. Consequently, they can be bonded at a higher bonding strength.

What is claimed is:

1. A driving apparatus, comprising a fixed member, an electromechanical transducer one end of which is fixed to the fixed member, and a driving friction member bonded to the other end of the electromechanical transducer, to move a movable unit which is slidably held by the driving friction member by expansion and contraction of the electromechanical transducer, said driving friction member including a section which is circularly arcuate in at least a part of a periphery, wherein:
   a bonded surface of the electromechanical transducer with respect to the driving friction member is included in a bonded surface of the driving friction member with respect to the electromechanical element, and
   a part of the electromechanical transducer including at least the bonded surface to the driving friction member is of a polygonal section circumscribed by the circularly arcuate periphery of the section of the driving friction member.

2. A driving apparatus, comprising a fixed member, an electromechanical transducer one end of which is fixed to the fixed member, and a driving friction member bonded to the other end of the electromechanical transducer, to move a movable unit which is slidably held by the driving friction member by expansion and contraction of the electromechanical transducer;

wherein:
   a bonded surface of the electromechanical transducer with respect to the driving friction member is included in a bonded surface of the driving friction member with respect to the electromechanical element.
   the bonded surface of the electromechanical transducer to the driving friction member is of a circular shape, and
   a part of the driving friction member including at least the bonded surface to the electromechanical transducer is of a circular shape larger in diameter than the bonded surface of the electromechanical transducer to the driving friction member.

3. A driving apparatus, comprising a fixed member, an electromechanical transducer one end of which is fixed to the fixed member, and a driving friction member bonded to the other end of the electromechanical transducer, to move a movable unit which is slidably held by the driving friction member by expansion and contraction of the electromechanical transducer;

wherein:

a bonded surface of the electromechanical transducer with respect to the driving friction member is included in a bonded surface of the driving friction member with respect to the electromechanical element.

the bonded surface of the electromechanical transducer to the driving friction member is of a square shape, and a part of the driving friction member including at least the bonded surface to the electromechanical transducer is of a circular shape circumscribing the square shape of the bonded surface of the electromechanical transducer.

4. A driving apparatus, comprising a fixed member, an electromechanical transducer one end of which is fixed to the fixed member, and a driving friction member bonded to the other end of the electromechanical transducer, to move a movable unit which is slidably held by the driving friction member by expansion and contraction of the electromechanical transducer;

wherein:

a bonded surface of the electromechanical transducer with respect to the driving friction member is included in a bonded surface of the driving friction member with respect to the electromechanical element, the bonded surface of the electromechanical transducer to the driving friction member is of a square shape, and a part of the driving friction member including at least the bonded surface to the electromechanical transducer is of a circular shape larger in diameter than a circle circumscribing the square shape of the bonded surface of the electromechanical transducer to the driving friction member.

5. A driving apparatus, comprising a fixed member, an electromechanical transducer one end of which is fixed to the fixed member, and a driving friction member bonded to the other end of the electromechanical transducer, to move a movable unit which is slidably held by the driving friction member by expansion and contraction of the electromechanical transducer;

wherein:

a bonded surface of the electromechanical transducer with respect to the driving friction member is included in a bonded surface of the driving friction member with respect to the electromechanical element, and the driving friction member is supported at both ends by bearings.

6. A driving apparatus, comprising:

a driving friction member which slidably holds a movable unit;

a fixed member; and an electromechanical transducer having one end fixed to the fixed member and the other end bonded to the driving friction member, the electromechanical transducer expanding and contracting to vibrate the driving friction member, thereby moving the movable unit with respect to the driving friction member said driving friction member including a section which is circularly arcuate in at least a part of a periphery, wherein:

a bonded surface of the electromechanical transducer with respect to the driving friction member is included in a bonded surface of the driving friction member with respect to the electromechanical element, and a part of the electromechanical transducer including at least the bonded surface to the driving friction member is of a polygonal section circumscribed by the circularly arcuate periphery of the section of the driving friction member.

7. A driving apparatus, comprising:

a driving friction member which slidably holds a movable unit;

a fixed member; and an electromechanical transducer having one end fixed to the fixed member and the other end bonded to the driving friction member, the electromechanical transducer expanding and contracting to vibrate the driving friction member, thereby moving the movable unit with respect to the driving friction member;

wherein:

a bonded surface of the electromechanical transducer with respect to the driving friction member is included in a bonded surface of the driving friction member with respect to the electromechanical element, the bonded surface of the electromechanical transducer to the driving friction member is of a circular shape, and a part of the driving friction member including at least the bonded surface to the electromechanical transducer is of a circular shape larger in diameter than the bonded surface of the electromechanical transducer to the driving friction member.

8. A driving apparatus, comprising:

a driving friction member which slidably holds a movable unit;

a fixed member; and an electromechanical transducer having one end fixed to the fixed member and the other end bonded to the driving friction member, the electromechanical transducer expanding and contracting to vibrate the driving friction member, thereby moving the movable unit with respect to the driving friction member;

wherein:

a bonded surface of the electromechanical transducer with respect to the driving friction member is included in a bonded surface of the driving friction member with respect to the electromechanical element, the bonded surface of the electromechanical transducer to the driving friction member is of a square shape, and a part of the driving friction member including at least the bonded surface to the electromechanical transducer is of a circular shape circumscribing the square shape of the bonded surface of the electromechanical transducer.

9. A driving apparatus, comprising:

a driving friction member which slidably holds a movable unit;

a fixed member; and an electromechanical transducer having one end fixed to the fixed member and the other end bonded to the driving friction member, the electromechanical transducer expanding and contracting to vibrate the driving friction member, thereby moving the movable unit with respect to the driving friction member;

wherein:

a bonded surface of the electromechanical transducer with respect to the driving friction member is included in a bonded surface of the driving friction member with respect to the electromechanical element, the bonded surface of the electromechanical transducer to the driving friction member is of a square shape, and a part of the driving friction member including at least the bonded surface to the electromechanical transducer is of a circular shape larger in diameter than a circle circumscribing the square shape of the bonded surface of the electromechanical transducer to the driving friction member.

10. A driving apparatus, comprising:
a driving friction member which slidably holds a movable unit; a fixed member; and
an electromechanical transducer having one end fixed to the fixed member and the other end bonded to the driving friction member, the electromechanical transducer expanding and contracting to vibrate the driving friction member, thereby moving the movable unit with respect to the driving friction member;
wherein:
a bonded surface of the electromechanical transducer with respect to the driving friction member is included in a bonded surface of the driving friction member with respect to the electromechanical element, and
the driving friction member is supported at both ends by bearings.

11. A driving apparatus comprising an electromechanical transducer, and a driving function member bonded to one end of the electromechanical transducer, to move a movable unit which is slidably held by the driving friction member by expansion and contraction of the electromechanical transducer,
wherein a bonded surface of the electromechanical transducer with respect to the driving friction member is included in a bonded surface of the driving friction member with respect to the electromechanical element,
wherein the driving friction member has a section which is circularly arcuate in at least a part of a periphery, and
a part of the electromechanical transducer including at least the bonded surface to the driving friction member is of a polygonal section circumscribed by the circularly arcuate periphery of the section of the driving friction member.

12. A driving apparatus comprising an electromechanical transducer, and a driving friction member bonded to one end of the electromechanical transducer, to move a movable unit which is slidably held by the driving friction member by expansion and contraction of the electromechanical transducer;
wherein:
a bonded surface of the electromechanical transducer with respect to the driving friction member is included in a bonded surface of the driving friction member with respect to the electromechanical element,
the bonded surface of the electromechanical transducer to the driving friction member is of a circular shape, and
a part of the driving friction member including at least the bonded surface to the electromechanical transducer is of a circular shape larger in diameter than the bonded surface of the electromechanical transducer to the driving friction member.

13. A driving apparatus comprising an electromechanical transducer, and a driving friction member bonded to one end of the electromechanical transducer, to move a movable unit which is slidably held by the driving friction member by expansion and contraction of the electromechanical transducer;
wherein:
a bonded surface of the electromechanical transducer with respect to the driving friction member is included in a bonded surface of the driving friction member with respect to the electromechanical element,
the bonded surface of the electromechanical transducer to the driving friction member is of a square shape, and
a part of the driving friction member including at least the bonded surface to the electromechanical transducer is of a circular shape circumscribing the square shape of the bonded surface of the electromechanical transducer.

14. A driving apparatus comprising an electromechanical transducer, and a driving friction member bonded to one end of the electromechanical transducer, to move a movable unit which is slidably held by the driving friction member by expansion and contraction of the electromechanical transducer;
wherein:
a bonded surface of the electromechanical transducer with respect to the driving friction member is included in a bonded surface of the driving friction member with respect to the electromechanical element,
the bonded surface of the electromechanical transducer to the driving friction member is of a square shape, and
a part of the driving friction member including at least the bonded surface to the electromechanical transducer is of a circular shape larger in diameter than a circle circumscribing the square shape of the bonded surface of the electromechanical transducer to the driving friction member.

15. A driving apparatus comprising an electromechanical transducer, and a driving friction member bonded to one end of the electromechanical transducer, to move a movable unit which is slidably held by the driving friction member by expansion and contraction of the electromechanical transducer;
wherein:
a bonded surface of the electromechanical transducer with respect to the driving friction member is included in a bonded surface of the driving friction member with respect to the electromechanical element, and
the driving friction member is supported at both ends by bearings.

16. A driving apparatus comprising:
a driving friction member which slidably holds a movable unit; and
an electromechanical transducer having one end bonded to the driving friction member, the electromechanical transducer expanding and contracting to vibrate the driving friction member, thereby moving the movable unit with respect to the driving friction member said driving friction member including a section which is circularly arcuate in at least a part of a periphery,
wherein:
a bonded surface of the electromechanical transducer with respect to the driving friction member is included in a bonded surface of the driving friction member with respect to the electromechanical element, and
a part of the electromechanical transducer including at least the bonded surface to the driving friction member is of a polygonal section circumscribed by the circularly arcuate periphery of the section of the driving friction member.

17. A driving apparatus comprising:
a driving friction member which slidably holds a movable unit; and
an electromechanical transducer having one end bonded to the driving friction member, the electromechanical transducer expanding and contracting to vibrate the driving friction member, thereby moving the movable unit with respect to the driving friction member;
wherein:
a bonded surface of the electromechanical transducer with respect to the driving friction member is included in a bonded surface of the driving friction member with respect to the electromechanical element, the bonded surface of the electromechanical transducer to the driving friction member is of a circular shape, and a part of the driving friction member including at least the bonded surface to the electromechanical transducer is of a circular shape larger in diameter than the bonded surface of the electromechanical transducer to the driving friction member.

18. A driving apparatus comprising:

a driving friction member which slidably holds a movable unit; and an electromechanical transducer having one end bonded to the driving friction member, the electromechanical transducer expanding and contracting to vibrate the driving friction member, thereby moving the movable unit with respect to the driving friction member;

wherein:

a bonded surface of the electromechanical transducer with respect to the driving friction member is included in a bonded surface of the driving friction member with respect to the electromechanical element, the bonded surface of the electromechanical transducer to the driving friction member is of a square shape, and a part of the driving friction member including at least the bonded surface to the electromechanical transducer is of a circular shape circumscribing the square shape of the bonded surface of the electromechanical transducer.

19. A driving apparatus comprising:

a driving friction member which slidably holds a movable unit; and an electromechanical transducer having one end bonded to the driving friction member, the electromechanical transducer expanding and contracting to vibrate the driving friction member, thereby moving the movable unit with respect to the driving friction member;

wherein:

a bonded surface of the electromechanical transducer with respect to the driving friction member is included in a bonded surface of the driving friction member with respect to the electromechanical element, the bonded surface of the electromechanical transducer to the driving friction member is of a square shape, and a part of the driving friction member including at least the bonded surface to the electromechanical transducer is of a circular shape larger in diameter than a circle circumscribing the square shape of the bonded surface of the electromechanical transducer to the driving friction member.

20. A driving apparatus comprising:

a driving friction member which slidably holds a movable unit; and an electromechanical transducer having one end bonded to the driving friction member, the electromechanical transducer expanding and contracting to vibrate the driving friction member, thereby moving the movable unit with respect to the driving friction member;

wherein:

a bonded surface of the electromechanical transducer with respect to the driving friction member is included in a bonded surface of the driving friction member with respect to the electromechanical element, and the driving friction member is supported at both ends by bearings.

* * * * *